United States Patent [19]
Eichenberger et al.

[11] 3,904,681

[45] Sept. 9, 1975

[54] PROPIONIC ACID

[75] Inventors: Kurt Eichenberger, Therwil; Christian Egli, Magden, both of Switzerland

[73] Assignee: Ciba-Geigy Corporation, Ardsley, N.Y.

[22] Filed: Feb. 7, 1974

[21] Appl. No.: 440,404

Related U.S. Application Data

[63] Continuation of Ser. No. 129,639, March 30, 1971, abandoned.

[52] U.S. Cl. ...... 260/519; 260/501.11; 260/501.12; 424/319
[51] Int. Cl.² ....................................... C07C 101/08
[58] Field of Search ........... 260/519, 501.11, 501.12

[56] References Cited
UNITED STATES PATENTS

| | | |
|---|---|---|
| 3,592,844 | 7/1971 | Reinhold et al. .................. 260/519 |
| 3,740,439 | 6/1973 | Eichenberger et al. ............. 260/519 |

FOREIGN PATENTS OR APPLICATIONS

| | | |
|---|---|---|
| 1,931,240 | 1/1970 | Germany |

OTHER PUBLICATIONS

Rodionow et al., Archiv der Pharmazie, Vol. 266, pp. 116–121 (1928).

Chemical Abstracts, Vol. 53, 2106e, (1959).

*Primary Examiner*—Anton H. Sutto
*Assistant Examiner*—L. A. Thaxton
*Attorney, Agent, or Firm*—Joseph G. Kolodny; Theodore O. Groeger; John J. Maitner

[57] ABSTRACT

(+)-β-Amino-β-(3,4-dimethoxy-phenyl)-propionic acid and its salts are useful as anti-hypertensive agents.

1 Claim, No Drawings

NEW PROPIONIC ACID

This is a continuation of application Ser. No. 129,639, filed Mar. 30, 1971 and now abandoned.

The invention relates to (+)-β-amino-β-(3,4-dimethoxy-phenyl)-propionic acid of the formula I

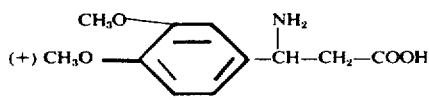     (I), as well as to processes for its manufacture.

(+)-β-Amino-β-(3,4-dimethoxy-phenyl)-propionic acid displays valuable pharmacological properties. Thus it displays, in particular, blood pressure-lowering effects, which can be demonstrated in experiments on animals, for example on renal hypertonic rats and dogs, on oral or subcutaneous administration in doses of about 30 mg/kg to about 300 mg/kg. (+)-β-Amino-β-(3,4-dimethoxy-phenyl)-propionic acid is therefore above all useful as an anti-hypertensive agent.

(+)-β-Amino-β-(3,4-dimethoxy-phenyl)-propionic acid is obtained according to methods which are in themselves known.

Thus (+)-β-amino-β-(3,4-dimethoxy-phenyl)-propionic acid can, for example, be obtained if in a compound of the formula IIa

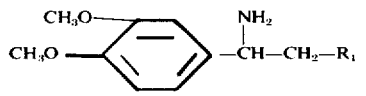     (IIa)

having the same absolute configuration as (+)-β-amino-β-(3,4-dimethoxy-phenyl)-propionic acid, wherein $R_1$ represents a radical which can be converted into the carboxyl group, the radical $R_1$ is converted into the carboxyl group. In particular (+)-β-amino-β-(3,4-dimethoxy-phenyl)-propionic acid can be obtained, if in a compound of the formula IIb

     (IIb)

wherein $R_1$ represents a radical which can be converted into the carboxyl group, the radical $R_1$ is converted into the carboxyl group.

A radical $R_1$ which can be converted into the carboxyl group is, in particular, a radical which can be converted into the carboxyl group by hydrolysis.

A radical which can be converted into the carboxyl group by hydrolysis is, for example, a functionally modified carboxyl group.

A functionally modified carboxyl group is, for example, a cyano group, or a functionally modified carboxyl group possessing an oxo or thioxo group.

The hydrolysis of a cyano group is carried out in the usual manner, for example in the presence of strong acid, for example a mineral acid, such as hydrochloric acid, and optionally with the addition of an oxidising agent, such as nitrous acid.

A functionally modified carboxyl group possessing an oxo or thioxo group is, for example, an esterified or amidised carboxyl group, an acid halide grouping, such as an acid chloride grouping, an acid anhydride grouping (for example also a ketene grouping), an acid azide grouping or a thioamide grouping, which can be converted into the carboxyl group, for example by treatment with water. The reaction is carried out in the usual manner, if desired in the presence of acid-binding agents, such as organic or inorganic bases, or optionally in the presence of catalysts and/or oxidising agents, optionally in an acid or neutral medium. A suitable thioamide grouping is, for example, a morpholino-thiocarbonyl group.

(+)-β-Amino-β-(3,4-dimethoxy-phenyl)-propionic acid can also be obtained by separating the (+)-form from DL-β-amino-β-(3,4-dimethoxyphenyl)-propionic acid.

The separation of the (+)-form can be carried out in the manner which is customary for the resolution of racemates.

For this purpose, the racemate can, for example, be converted into salts, such as into salts with suitable optically active bases, or into acid addition salts with suitable optically active acids, such as optically active camphorsulphonic acid, the resulting mixtures of the disastereoisomeric salts are then separated into the individual diastereoisomeric salts on the basis of physicochemical differences, for example differences in solubility, crystallisability and the like, and if desired the (+) -aminoacid is liberated, for example by treatment with suitable acids or bases. It is, however, also possible, for example, to precipitate the (−) -aminoacid as a salt from a solution of the racemate by reaction with suitable optically active bases or acids, such as those mentioned above, and to isolate the desired (+) -aminoacid from the mother liquor.

Further, the (+)-form can also be isolated from the DL-compound by fractional crystallisation from a suitable solvent, where appropriate also from an optically active solvent, or by chromatography, such as especially thin layer chromatography, on an optically active carrier material, or by treatment with suitable microorganisms.

Further, the (+)-β-amino-β-(3,4-dimethoxy-phenyl)-propionic acid can be obtained if, in a compound of the formula IIIa

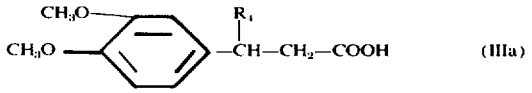     (IIIa)

having the same absolute configuration as (+)-β-amino-β-(3,4-dimethoxy-phenyl)-propionic acid, wherein $R_4$ represents a radical which can be converted into the amino group, the radical $R_4$ is converted into the amino group. In particular, the (+)-β-amino-β-(3,4-dimethoxy-phenyl)-propionic acid can be obtained, if in a compound of the formula IIIb

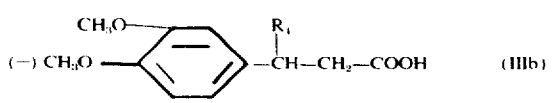     (IIIb)

wherein R₄ represents a radical which can be converted into the amino group, the radical R₄ is converted into the amino group.

Such radicals R₄ are especially amino groups which carry a radical which can be split off by reduction or solvolysis.

Radicals which can be split off by reduction are, for example, α-aralkoxycarbonyl radicals, such as benzyloxycarbonyl radicals. The reduction can be carried out in the usual manner, especially by hydrogenolysis for example by hydrogen in the presence of a hydrogenation catalyst, for example palladium or platinum. Further suitable radicals of this nature are β-halogenoethoxycarbonyl radicals, such as the 2,2,2-trichloroethoxycarbonyl radical, the 2,2,2-tribromoethoxycarbonyl radical, the 2-bromoethoxycarbonyl radical, the 2-iodoethoxycarbonyl radical and the benzoylmethoxycarbonyl radical. The reduction can be effected in the usual manner, especially by metallic reduction (so-called nascent hydrogen). Nascent hydrogen can in this case be obtained by the action of metal or metal alloys on agents which yield hydrogen, such as carboxylic acids, alcohols or water, and in particular zinc or zinc alloys together with acetic acid can be used. The reduction of β-halogenoethoxycarbonyl radicals can preferably be effected by means of chromium-II compounds, such as chromium-II chloride or chromium-II acetate.

Radicals which can be split off by solvolysis are especially radicals which can be split off by hydrolysis or hydrazinolysis.

Amino groups carrying radicals which can be split off hydrolytically are, for example, acylated amino groups.

Acylated amino groups are, for example, those wherein the acyl radicals are oxycarbonyl radicals, such as alkoxycarbonyl radicals, for example tert.-butoxycarbonyl radicals, aralkoxycarbonyl radicals, for example carbobenzoxy radicals, and especially lower alkanoyl radicals or aryloyl radicals, for example acetyl radicals, benzoyl radicals or phthaloyl radicals.

The hydrolysis is carried out in the usual manner by means of hydrolysing agents and, for example, in the presence of acid agents. Suitable acid agents are, for example, dilute inorganic acids, such as sulphuric acid or a hydrohalic acid, such as hydrochloric acid or hydrobromic acid. A tert.-butoxycarbonylamino radical can, however, also be converted into the amino group under anhydrous conditions, for example by treatment with a suitable acid, such as trifluoroacetic acid.

Amino groups carrying radicals which can be split off by hydrazinolysis are, for example, phthalimido radicals. These can be converted into the amino groups in the usual manner, for example by treatment with hydrazine, optionally in the form of the hydrate.

(+)-β-Amino-β-(3,4-dimethoxy-phenyl)-propionic acid can also be obtained if in a compound of the formula IVa

(IVa)

having the same absolute configuration as (+)-β-amino-β-(3,4-dimethoxy-phenyl)-propionic acid, wherein Ph represents a radical which can be converted into a 3,4-dimethoxyphenyl radical, Ph is converted into such a radical.

In particular, (+)-β-amino-β-(3,4-dimethoxyphenyl)-propionic acid can be obtained, it in a compound of the formula IVb

(IVb), wherein Ph represents a radical which can be converted into a 3,4-dimethoxyphenyl radical, Ph is converted into such a radical.

A radical Ph which can be converted into a 3,4-dimethoxyphenyl radical is, for example, a phenyl radical, which instead of at least one of the methoxy groups in each case contains a hydroxyl group. The conversion of such hydroxyphenyl radicals into 3,4-dimethoxyphenyl radicals is carried out in the usual manner, especially by reaction of the hydroxyphenyl radical with a reactively esterified methanol or a diazomethane. A suitable reactively esterified methanol is especially esterified with a strong inorganic or organic acid, for example with a hydrohalic acid, such as hydrobromic and hydriodic acid, sulphuric acid, or with an organic sulphonic acid, such as an aromatic sulphonic acid, for example benzenesulphonic or toluenesulphonic acid. Dimethyl sulphate is, for example, particularly suitable. In the above reactions with a reactively esterified methanol, a condensation agent is advantageously added, especially an alkaline condensation agent, such as an alkali metal carbonate or bicarbonate or an alkaline earth metal carbonate or bicarbonate, for example potassium carbonate or potassium bicarbonate. Diazomethane is advantageously used in a suitable solvent, such as ether, ethanol or benzene. In these reactions the amino group is protected if appropriate, especially as indicated below.

The invention also relates to those embodiments of the process in which the process is stopped at any stage or in which one starts from a compound obtainable as an intermediate product at any stage and carries out the missing steps, or forms a starting substance under the reaction conditions or, if appropriate, uses it in the form of a salt.

The reactions mentioned are carried out in the usual manner, in the presence or absence of diluents, condensation agents and/or catalytic agents, at lowered, ordinary or elevated temperature and optionally in a closed vessel and/or under an inert gas atmosphere. If required, functional groups can be protected whilst carrying out one of the reactions mentioned. Thus, in particular, amino groups can be protected, for example, by acylation, for example as phthalimido radicals, above all in the case of oxidation reactions, after which the amino group is subsequently again liberated, in particular as described above.

In the reactions mentioned, the absolute configuration does not change.

The starting substances can be obtained according to methods which are in themselves known.

Thus it is in particular possible to isolate the (+)-form or (−)-form according to methods which are in themselves known from the racemates corresponding to the starting substances. These racemates can for example be converted into salts, preferably into salts with optically active bases, such as optically active α-phenylethylamine, α-(1-naphthyl)-ethylamine, quinine, cinchonidine or brucine, and also into acid addition salts with suitable optically active acids, such as the D- and L-forms of tartaric acid, di-o-toluyltartaric acid, malic acid, mandelic acid, camphorsulphonic acid, quinic acid or lactic acid; the resulting mixtures of the corresponding salts are separated into the diastereoisomeric salts on the basis of physico-chemical differences, for example in solubility, crystallisability and the like, and the optically active antipodes are liberated from the salts.

It is further possible to react a racemate in the salt form with an optically active metal complex salt, or a racemate in the free form with an optically active metal complex hydroxide, and to separate off the less soluble product and liberate the desired starting substance. Suitable optically active metal complexes are, for example, optically active cobalt nitrate complex compounds.

Starting substances of the formula IIa with the same absolute configuration as (+)-β-amino-β-(3,4-dimethoxy-phenyl)-propionic acid, wherein $R_1$ is an esterified carboxyl group, can be obtained, if DL-β-amino-β-(3,4-dimethoxy-phenyl)-propionic acid or a derivative thereof, such as an acid halide or anhydride, is esterified with an optionally active alkohol and separating the desired ester antipode.

It is furthermore also possible to isolate the (+)-form of (−)-form of the starting substances from these racemates by fractional crystallisation from a suitable solvent, optionally also from an optically active solvent, or by means of chromatography, especially thin layer chromatography, or an optically active carrier.

Depending on the process conditions and starting substances, (+)-β-amino-β-(3,4-dimethoxy-phenyl)-propionic acid is obtained in the free form or in the form of its salts, which are also included in the invention.

Salts can be converted into the free compound in a manner which is in itself known, acid addition salts for example being converted by reaction with a basic agent, and salts with bases being converted, for example, by reaction with acid agents; these exchange reactions can also be carried out in ion exchangers (in the solid form on columns, or in liquid form by countercurrent distribution).

On the other hand, the resulting free compound can form salts, preferably non-toxic, pharmaceutically usable salts, with inorganic or organic acids or metal salts, such as alkali metal or alkaline earth metal salts, or with ammonia or suitable amines. Inorganic acids, for example hydrohalic acids, such as hydrochloric acid or hydrobromic acid, perchloric acid, nitric acid or thiocyanic acid, sulphuric or phosphoric acids, or organic carboxylic or sulphonic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, hydroxymaleic acid, dihydroxymaleic acid, benzoic acid, phenylacetic acid, 4-amino-benzoic acid, 4-hydroxy-benzoic acid, anthranilic acid, cinnamic acid, mandelic acid, salicylic acid, 4-amino-salicylic acid, 2-phenoxy-benzoic acid, 2-acetoxy-benzoic acid, nicotinic acid, isonicotinic acid, embonic acid, methanesulphonic acid, ethanesulphonic acid, hydroxyethanesulphonic acid, benzenesulphonic acid, p-toluenesulphonic acid, naphthalenesulphonic acid, N-cyclohexyl-sulphamic acid or sulphanilic acid, as well as ascorbic acid, can in particular be used for the manufacture of acid addition salts, and, for example, alkali metal, such as sodium or potassium, carbonates, bicarbonates or hydroxides, or corresponding alkaline earth metal, such as calcium or magnesium, compounds, or ammonia, as well as amines, such as aliphatic amines, for example lower alkylamines, such as trimethylamine or triethylamine, can in particular be used for the manufacture of salts with bases. Aluminium salts, for example salts of two mols of aminoacid (I) and one mol of aluminium hydroxide, are also suitable, especially because of their slower resorption, lack of odour and slight gastro-intestinal disturbances.

Salts, such as, for example, acid addition salts, with the abovementioned acids, as well as with other acids, such as mineral acids or acid nitro compounds, can also be used for purification purposes, by separating salts from the reaction mixtures and obtaining the free compound from them. Because of the close relationships between the new compound in the free form and in the form of their salts, the corresponding salts or the free compound are, where appropriate, also to be understood, in the preceding and following text, to be included under the free compound or its salts, with regard to general sense and intended purpose.

The invention also encompasses pharmaceutical preparations containing (+)-β-amino-β-(3,4-dimethoxy-phenyl)-propionic acid of the formula I together with a pharmaceutical excipient.

The present invention also encompasses the treatment of hypertonia by administration of (+)-β-amino-β-(3,4-dimethoxy-phenyl)-propionic acid of the formula I in the form of pharmaceutical preparations; in this treatment, doses of about 0.5 g to about 5.0 g, preferably about 1.5 g to about 3 g, of (+)-β-amino-β-(3,4-dimethoxy-phenyl)-propionic acid are used daily.

The new pharmaceutical preparations are manufactured in a manner which is in itself known, usually by mixing the active substance with pharmaceutical, organic or inorganic, solid or liquid excipients which are suitable for enteral, for example oral, or parenteral administration. Possible excipients are those which do not react with the new compounds, such as, for example, water, gelatine, sugars, such as lactose or glucose, starches, such as wheat starch, corn starch or rice starch, stearic acid or salts thereof, such as calcium stearate or magnesium stearate, talc, vegetable oils, benzyl alcohols, gum, polyalkylene glycols or other known medicinal excipients. The pharmaceutical preparations can optionally be sterilised and/or contain auxiliary substances, such as preservatives, stabilisers, wetting agents or emulsifiers, salts for regulating the osmotic pressure or buffers.

In addition to the abovementioned pharmacologically active compound, the pharmaceutical preparations according to the invention can contain other therapeutically valuable substances, such as, for example, other anti-hypertensive agents, especially Rauwolfia alkaloids, such as reserpine, rescinnamin or deserpidine, and similar compounds, such as syrosingopine, veratrum alkaloids, such as germine or protoveratrine, or above all synthetic, anti-hypertensive and/or diuretically acting agents, such as chlorothiazide, hydrochlorothiazide, cyclopenthiazide or analogous compounds, 3-(3-sulphamyl-4-chloro-phenyl)-3-hydroxy-isoindolin-1-one, hydralazine, dihydralazine, guanethidine or ganglion-blocking agents, such as chloroisondamine.

The invention is described in more detail in the Examples which follow.

EXAMPLE 1

1 g of (−)-β-acetylamine-β-(3,4-dimethoxy-phenyl)-propionic acid in 15 ml of 2 N hydrochloric acid is heated for 6 hours under reflux. After cooling, the reaction solution is extracted with methylene chloride. The aqueous acid phase is treated with charcoal and filtered. The filtrate is evaporated to dryness. (+)-β-Amino-β-(3,4-dimethoxy-phenyl)-propionic acid hydrochloride of the formula

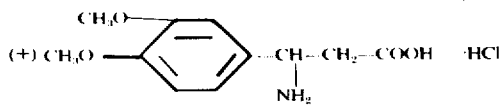

is obtained as the residue. The (−)-β-acetylamino-β-(3,4-dimethoxy-phenyl)-propionic acid used as the starting material can be manufactured as follows:

A solution of 1.21 g of (−)-1-phenylethylamine in 2 ml of methanol is added to a solution of 2.67 g of β-acetylaminoβ-(3,4-dimethoxy-phenyl)-propionic acid in 80 ml of methanol. On adding ether, crystallization starts. The crystals which have precipitated are repeatedly recrystallized from ethanol/ether. 1.5 g of the crystals thus obtained are taken up in 8 ml of water and 2.1 ml of 2 N sodium hydroxide solution. The resulting alkaline solution is extracted by shaking with chloroform. Thereafter, it is acidifed with dilute hydrochloric acid and again extracted with chloroform. The chloroform solution is dried and evaporated. The residue thus obtained is washed with water and recrystallised from ethyl acetate. (−)-β-Acetylamino-β-(3,4-dimethoxy-phenyl)-propionic acid is thus obtained.

EXAMPLE 2

27.7 g of (−)-β-acetylamino-β-(3,4-dimethoxy-phenyl)-propionic acid in 280 ml of 1 N hydrochloric acid are heated for 6 hours under reflux. After cooling, the mixture is extracted with methylene chloride. The aqueous acid phase is treated with active charcoal and filtered. The filtrate is evaporated to dryness in vacuo at about 10°C. The residue is recrystallised from 95% strength ethanol-ether. The hydrochloride of (+)-β-amino-β-(3,4-dimethoxy-phenyl)-propionic acid of the formula

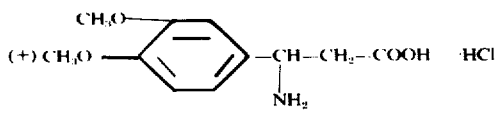

of melting point 204°–206°C; $[\alpha]_D = +6° \pm 1°$; $[\alpha]_{313m\mu} = +43° \pm 1°$ ($c = 1\%$ in 0.1 N HCl) is thus obtained. 22.7 g of (+)-β-amino-β-(3,4-dimethoxyphenyl)-propionic acid hydrochlorid are dissolved in 1.2 l of absolute ethanol and treated with 8.7 g of triethylamine. The mixture is stirred for 2 hours at 20°C and the crystals which have precipitated are filtered off. (+)-β-Amino-β-(3,4-dimethoxy-phenyl)-propionic acid of melting point 224°–225°C (decomposition); $[\alpha]_D = +7° \pm 1°$; $[\alpha]_{313m\mu} = +49° \pm 1°$ ($c = 1\%$ in 0.1 N HCl) is thus obtained.

The (−)-β-acetylamino-β-(3,4-dimethoxy-phenyl)-propionic acid used as the starting substance can be manufactured as follows:

182 g of (−)-1-phenylethylamine are added to a suspension of 400 g of β-acetylamino-β-(3,4-dimethoxy-phenyl)-propionic acid in 3 l of methanol, whereupon a clear solution is produced. 4.5 l of ether are introduced whilst stirring. Thereafter the mixture is allowed to stand at a temperature of 0°C to −5°C for about 60 hours. The supernatant solution is then decanted. The crystal mass is stirred with acetone, filtered off and washed with water. The (−)-1-phenylethylamine salt of (−)-β-acetylamino-β-(3,4-dimethoxy-phenyl)-propionic acid, of melting point 165°–167°C, is thus obtained; $[\alpha]_D = −56° \pm 1°$ ($c = 1\%$ in methanol).

58.4 g of this salt are dissolved in 75 ml of water and rendered alkaline with 28 ml of concentrated sodium hydroxide solution. The mixture is extracted with petroleum ether and the aqueous alkaline phase is rendered acid with 28 ml of concentrated hydrochloric acid. After cooling in an ice bath, the crystals which have precipitated are filtered off and washed with water. (−)-β-Acetylamino-β-(3,4-dimethoxyphenyl)-propionic acid of melting point 157-158°C, $[\alpha]_D = −93°$ ($c = 1\%$ in methanol) is obtained. After recrystallisation from water, the melting point rises to 159°–160°C, $[\alpha]_D = −96° \pm 1°$ ($c = 1\%$ in methanol).

EXAMPLE 3

2.2 g of (+)-β-amino-β-(3,4-dimethoxy-phenyl)-propionic acid methyl ester hydrochloride ($[\alpha]_D = +14°$, $c = 1\%$ in 0.1 N HCl) in 22 ml of 2 N hydrochloric acid are heated for 2 hours under reflux. Thereafter, the reaction solution is evaporated in vacuo, and the residue is treated with 95% strength ethanol and filtered. On adding ether, (+)-β-amino-β-(3,4-dimethoxyphenyl)-propionic acid hydrochloride of the formula

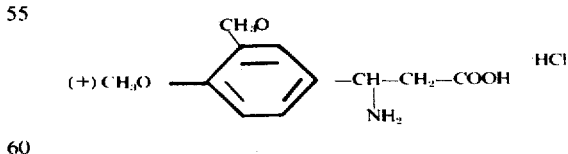

of melting point 202°–203°C (decomposition); $[\alpha]_D = +7° \pm 1°$ ($c = 1\%$ in 0.1 N HCl), crystallises out.

EXAMPLE 4

Tablets containing 0.5 g of the active substance are manufactured as follows:

Composition (for 10,000 tablets):

| | |
|---|---|
| (+)-β-Amino-β-(3,4-dimethoxy-phenyl)-propionic acid | 5000 g |
| Lactose | 600 g |
| Wheat starch | 200 g |
| Colloidal silica | 200 g |
| Microcrystalline cellulose | 670 g |
| Talc | 300 g |
| Magnesium stearate | 30 g |

A mixture of the (+)-β-amino-β-(3,4-dimethoxyphenyl)-propionic acid, the lactose, the wheat starch and the colloidal silica is forced through a sieve and granulated using an ethanol-water mixture. The dried and sieved granules are homogeneously mixed with the micro-crystalline cellulose, the talc and the magnesium stearate, and the mixture is converted into tablets weighing 0.7 g and having a cross-notch.

EXAMPLE 5

Tablets containing 0.4 g of the active substance are manufactured as follows:

Composition (for 2000 tablets):

| | |
|---|---|
| (+)-β-Amino-β-(3,4-dimethoxy-phenyl)-propionic acid | 800 g |
| Lactose | 120 g |
| Wheat starch | 40 g |
| Colloidal silica | 40 g |
| Microcrystalline cellulose | 134 g |
| Talc | 60 g |
| Magnesium stearate | 6 g |

Tablets weighing 0.6 g are manufactured according to the process described in Example 4.

We claim:
1. (+)-β-Amino-β-(3,4-dimethoxy-phenyl)-propionic acid, or a therapeutically usable salt thereof.

* * * * *